June 14, 1927.
E. M. MORLEY
1,632,618
AIR PRESSURE REGULATOR
Original Filed Feb. 8, 1924    2 Sheets-Sheet 1
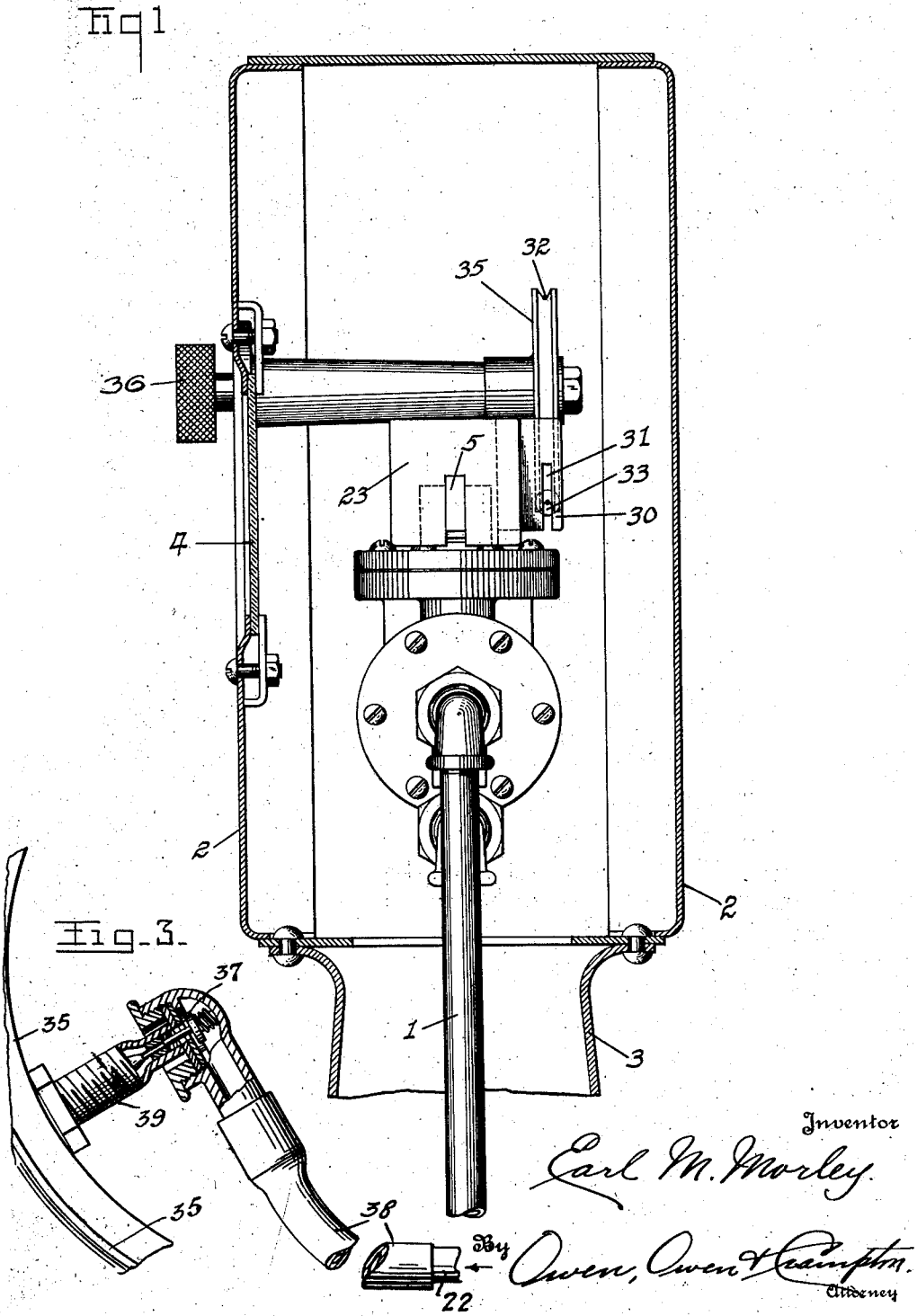
Inventor
Earl M. Morley.

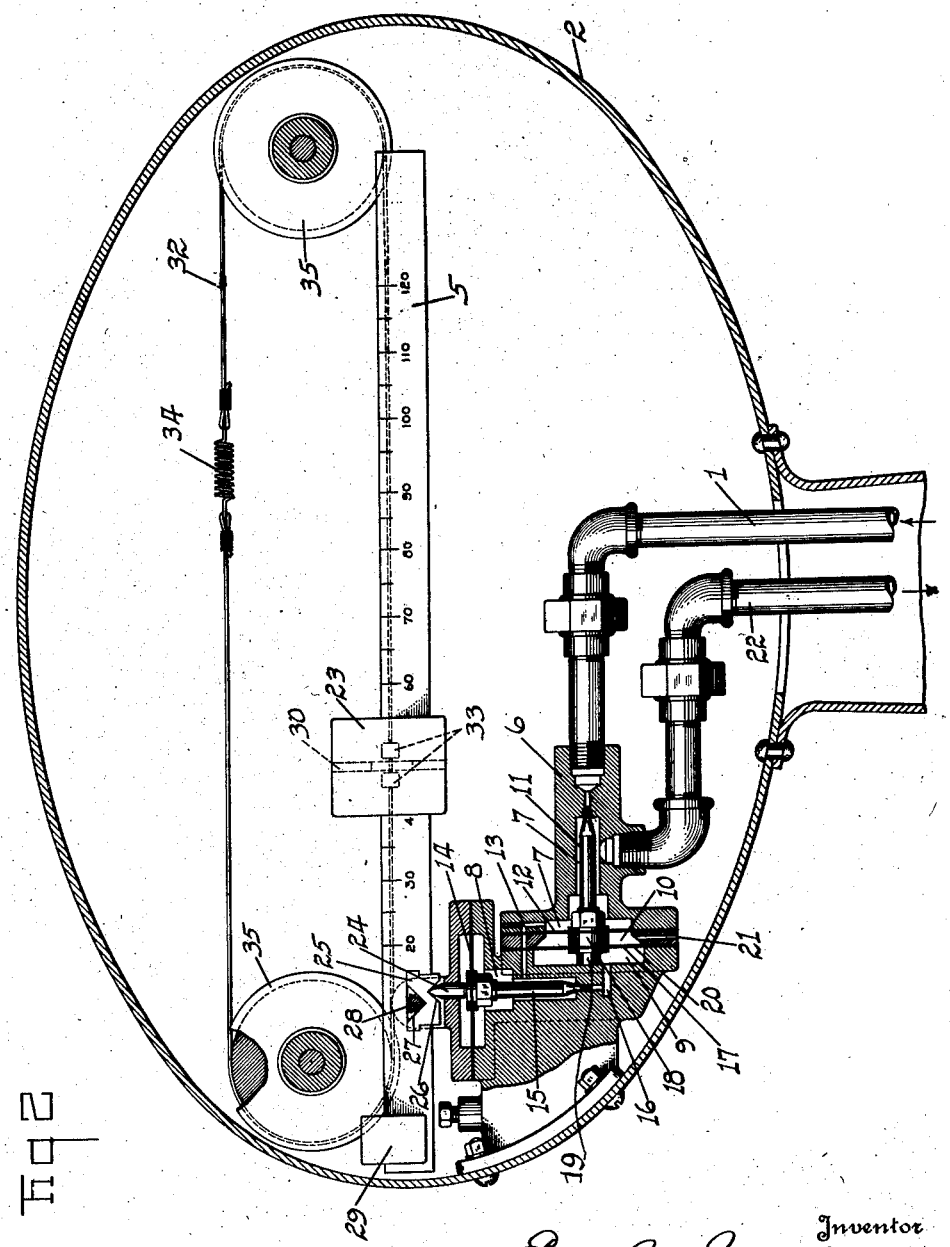

Patented June 14, 1927.

1,632,618

UNITED STATES PATENT OFFICE.

EARL M. MORLEY, OF DELTA, OHIO, ASSIGNOR, BY DIRECT AND MESNE ASSIGNMENTS, TO THE AIR-SCALE COMPANY, OF TOLEDO, OHIO, A CORPORATION OF OHIO.

AIR-PRESSURE REGULATOR.

Application filed February 8, 1924, Serial No. 691,419. Renewed August 5, 1926.

My invention has for its object to provide a device that will adjustably control the pressure of air supplied from a source to any air-containing member such as a pneumatic tire of an automobile. The invention provides an automatic air valve controlled by an adjustable pressure exerting means.

The invention may be contained in structures of different forms. To illustrate a practical application of the invention, I have selected a structure containing the invention and shall describe it hereinafter. The structure selected is illustrated in the accompanying drawings.

Referring to the drawings:

Fig. 1 is a vertical section through the case showing the shell or valve mechanism in end elevation; and Fig. 2 is a vertical section through the case parallel to the front showing the shell portion of the valve mechanism also in section.

The pressure regulator shown in the drawings is connected to a suitable device for supplying air under pressure such as to a tank into which air is pumped by a suitable air pump. The pressure of the air supplied to the pressure regulator is preferably maintained well above that commonly used or drawn from the regulator. The air is supplied to the regulator through the pipe 1 that may be connected to a tank containing air under pressure.

The regulator is, preferably, located within a case 2 that is supported on a hollow standard 3 and to be the height of a man in order that the adjustments may be easily observed and correctly made. The case 2 is provided with a glass panel 4 through which a scale that will indicate the degree of adjustment, such as the scale beam 5, may be seen.

The pipe 1 is connected to a shell or valve housing 6. The walls of the shell 6 are so formed as to provide two chambers. One of the chambers is subdivided into three chambers or compartments by flexing diaphragms, thus forming within the shell 6 four chambers, 7, 8, 9 and 10. The passageway leading from the pipe 1 into the chamber 7 may be closed under certain conditions by the movable primary valve member 11. When the air in pipe 1 is at atmospheric pressure, the valve is held in open position by the elasticity of the diaphragms. This is the condition when there is no air pressure in pipe 1, which no air pressure condition is not the condition of use for the apparatus of this disclosure. The valve member 11 is connected to the diaphragm 12 that is secured in position by parts of the shell 6.

The air enters the chamber 7 and presses on the diaphragm 12. It then passes through the passageway 13 into the chamber 8 and presses on the diaphragm 14. It may raise the diaphragm 14 according to the pressure produced in the chamber 8. A secondary valve member 15 is connected to the diaphragm 14. When the diaphragm is raised, the valve member 15 opens the passageway 16 leading to the chamber 9 and the air presses against the diaphragm 17.

The diaphragm 17 is larger than, and is located in parallel relation to, the diaphragm 12. They are connected together by a spacing member 18 and a limiting stop 19 may be positioned on the diaphragm 17 to limit the movements of the movable valve member 11 between its seat and the wall of the shell 6, against which the stop 19 makes contact.

Pressure within the chamber 9, though it is no greater than the pressure within the chamber 7, will, by reason of the difference in sizes of the diaphragms 12 and 17, close the valve member 11 and thus cut off the supply of air through the pipe 1.

A very small opening 20 is formed in the diaphragm 17 to allow the air to very slowly escape into the chamber 10 located between the diaphragms 12 and 17. The air freely passes from the chamber 10 through the passageway 21 formed in the wall of the shell 6 and escapes to the outside atmosphere.

An outlet pipe 22 is connected to the chamber 7, from which the air will pass into the pipe 22 at a pressure that is determined by the position of the weight 23 on the scale beam 5.

The scale beam 5 is supported on the pin 24 that rests on the diaphragm 14. The scale is provided with a block 25 having V-shaped notches 26 and 27. The pin 24 engages in the notch 26 and the V-shaped cross bar 28 connected to the shell 6 passes through an opening formed in the scale beam and engages the block 25 in the notch 27. The beam extends beyond the bar 28 to provide for the support of a counter-balance weight 29 that will be adjustably located so as to correct the apparatus to more accurately respond to the adjustments of the weight 23, as indicated by the markings of the scale beam.

In the operation, an automobile tire 36 is connected to the pipe 22 through the usual valve 37 for controlling flow of air from the hose 38, preferably, after the weight 23 has been set to the number on the scale indicating the air pressure that it is desired to create in the tire by the introduction of air. It may first be assumed that there is no pressure on the pipe 1. Upon connecting such with the pressure receiver or pump, flow of air from the pipe 1 into chamber 7 is permitted by the valve 11, not only to build up pressure in the pipe 22, as closed by the valve 37, but there is additionally a much slower flow by way of opening or passageway 13 into chamber 8, to act upon diaphragm 14 in lifting the scale beam 5 and also the needle valve 15 permitting flow by way of the passage 16 into the chamber 9. This pressure, as approaching the pressure in the chamber 7, due to the larger area of the diaphragm 17, at such time becomes effective against the pressure on the diaphragm 12 to throw the valve 11 into closed position. The diaphragm 17 has small opening 20 therein communicating through chamber 10 with leakage opening 21. Accordingly, at once the valve 11 closes, there is, through the passageway 13, valve 15, duct 16, chamber 9, vent opening 20, chamber 10, and leakage opening 21, a very slow leakage of air. This leakage of air means that there will be a drop of pressure in the chamber 8 and that the diaphragm 14 will then be effective for closing the valve 15, so that the leakage of air does not extend back into the chambers 8, 7, and the line 22, but is only in the chamber 9. As this leakake further decreases the pressure in the chamber 9, the diaphragm 12 as to the residual pressure trapped in the chamber 7, is effective to open the valve 11, repeating this cycle of these operations. Accordingly there is a slow intermittent non-tire filling operation of the valve 11 even with the hose valve 37 closed. These intermissions are so slow that for all practical purposes the valve 11 is really maintained closed.

It will be understood during the idle or non-tire filling operation that the scale beam 5 is normally lifted as in the idle operation and consequently that the needle valve 15 is open. This allows the pressure in the pipe 22, chambers 7, 8, 9, to equalize, which on account of the diaphragm 17 being of greater area than the diaphragm 12, effects a positive holding of the needle valve 11 just beyond a balanced closed position against the pressure in the supply line 1. The chamber 9 is relatively of very small capacity. The beam 5, with its weight 23 acting through the pin 24, tend to shift the diaphragm 14 with needle valve 15 into closed position as soon as the pressure in the chamber 8 has decreased below that necessary to sustain the beam 5 in its elevated position. With this relatively small capacity chamber 9 thus cut off from replenishment, but slight seepage through the minute opening 20 so disturbs the just-beyond balanced closed position of the valve 11 that the pressure in the line 1 is effective almost instantaneously to open the valve 11 and give a puff of the pressure air into pipe 22, chamber 7, passage 13 into the chamber 8. The diaphragm 14 is then effective for returning the scale beam 5 to its lifted position with opening of the valve 15 for replenishment of the chamber 9 and resultant closing of the valve 11.

When the valve 15 closes, there is but slight interval for seepage in reducing the pressure in the chamber 9 before the valve 11 opens. However, when the valve 11 opens, allowing the air to flow through the passage 13, into chamber 8, it builds up the pressure of such chamber sufficiently to lift the beam 5 and its weight 23 to thereby open the valve 15. The very great slowness in this cycle of idle operations, wherein the valve 11 is normally closed, and the valve 15 normally open, is disturbed when air delivery occurs, say by opening hose valve 37 when such is applied to valve stem 39. There is at once a quick reduction of air pressure in the chambers 7, 8, 9, as well as in the pipe 22, which has, on the differential diaphragm, the same effect as a continuation of the seepage of air through the opening 20, because the opening pressure from the pipe 1 on the valve 11 is resisting this lower pressure differential diaphragm action. This reduction in pressure is effective in the chambers 7, 8, bringing about a closing of the valve 15 at once. The small volume chamber 9 with leakage therefrom through the opening 20 has the pressure in the line 1 at once kick the valve 11 into fully open position with a rushing of air into the pipe 22 and chamber 7, with the slower rate of delivery to the chamber 8 owing to the passageway 13. As this pressure is built up in the chamber 8, the valve 15 is opened and the puff of this pressure air closes the valve 11. This connection of the hose valve 37 to the tire valve 39 provides a supplemental restricted vent in addition to the passage 13. This latter passage 13 coacts in the control mechanism as means for retarding the control or closing effect of the valve 11 to afford an interval in which the stepped built up pressure of air may flow in the pipe 22. The size of this opening 13 is determined by experiment and said determination effects the duration of the air flow interval. The pressure in the chamber 9 is not constant.

It builds up quickly to close the valve 11 and diminishes slowly as the valve 15 closes. The pressure in the chamber 8 does not drop so rapidly from the set pressure for the tire as the pressure in the chamber 7, for the chamber 7 has the discharge-way to the pipe 22 directly therefrom of greater capacity than the connecting way 13 between the chambers 7 and 8. The pressure builds up more rapidly in the chamber 7 and the pipe 22 than flow through the valves 37, 39, permits building up of pressure in the tire. This step building up of pressure in the chamber 7 acts upon the diaphragm devices to effect closing of the valve 11. The valves 37, 39, being open, allow for a quick pressure reduction in the chamber 7. There is, accordingly, not sufficient pressure to build up in the chamber 8 to open the valve 15. The continual seepage from the chamber 9 removes the differential diaphragm effectiveness for holding the valve closed and there is a gushing in of the high pressure air with the opening of the valve 11, not only to the pipe 22, but more slowly through the duct 13 to the chamber 8. With this relatively retarded flow to the chamber 8 as built up to open the valve 15, the pressure in the chamber 9 is replenished and again closes the valve 11 in this re-operation of the diaphragm devices. This means a more frequent recurrence of the intermittent operation of the valve when the device is connected up for use in charging an automobile tire or other receiver. These intermissions initially deliver larger volumes of the supply air, while the later volumes are of much reduced quantity. As soon as the hose valve 38 is opened by pressure on the valve stem 39 of the tire 36 in the manner well known in the art, the air passes from the pipe 1, the chamber 7 and the pipe 22 into the tire. If the tire pressure is below that at which the weight 23 is set, the weight 23 operates to hold the valve member 15 closed until the pressure in the pipe 22 rises above the predetermined point or desired pressure, whereupon the pressure transmitted through the passageway 13 will operate on the diaphragm 14 to open the valve member 15 and air will pass into the chamber 9 and press upon the diaphragm 17 that is larger than the diaphragm 12, against which the predetermined pressure is being exerted. This will close the valve member 11 and shut off the air supply.

The pressure of the air in chamber 9 gradually reduces by reason of escape through the small opening 20 that is formed in the diaphragm 17, through which it passes into the chamber 10 and from the chamber 10 into the outside atmosphere through the passageway 21. This will immediately cause the valve member 11 to open but the pressure being higher than that determined by the position of the weight 23 on the scale beam 5, the valve member 15 will be opened and the air will escape through the opening 20 and the passageway 21 into the outside atmosphere. Thus the pressure of the air within the tire will be the amount determined by the position of the weight 23 on the scale beam 5. If a greater pressure is desired, the weight 23 will be moved to a higher member. This will require a greater pressure to open the valve 15 and when the pressure reaches this point, the valve 15 will again be opened by the pressure on the diaphragm 14, which over-balances the weight 23.

In order that the weight 23 may be shifted from a point on the outside of the case 2, it is connected to a cable by means of a fin 30 having a slot 31 through which the cable 32 extends. A pair of collars 33 is connected to the cable on opposite sides of the fin 30, so that when the cable is pulled in one direction it will pull the weight 23 by reason of the engagement of one of the collars with the fin, and when pulled in the opposite direction it will move the weight 23 by the engagement of the other collar with the fin. In order to move the cable 32, it is made in the form of a belt and its ends may be connected together by means of a spring 34 to keep the cable taut. The cable is located on a pair of pulleys 35 located at opposite ends of the scale beam. Suitable handles or knobs 36 may be connected to the pulleys 35 to rotate them and thus to shift the weight 23 to any desired point on the scale 5.

I claim:—

1. The combination with a source of air under pressure; of piping through which air is conveyed from said source to a receiver, a valve between said source and piping and constrained to move in a closing direction; mechanism in controlling relation to said valve and connected with the piping and operable by air admitted thereto from said piping, said mechanism being constrained to operate reversely upon sufficient reduction of the pressure of the air admitted thereto, said mechanism in being air operated enabling the operation of the valve in a closing direction and in being reversely operated causing an opening adjustment of the valve; and means supplied to the valve controlling mechanism for retarding the valve closing effect thereof to afford an interval in which air may flow into the piping at the pressure of the source, intermittent operation of the valve obtaining until air is accumulated in the receiver of sufficient pressure to operate upon said valve controlling mechanism to maintain the valve closed.

2. A tire inflation apparatus comprising a primary air delivery valve, a secondary valve, a diaphragm, there being a chamber for the diaphragm in communication with delivery pressure from the primary valve as affected by the interposition of the secondary valve, said chamber having an exhaust vent open during primary valve closing movement, and a control connection including an adjustable lever for changing the pressure response region of said diaphragm for pulsation discontinuance region in determining primary valve closing.

3. A tire inflation apparatus embodying a pressure air supply line, a pressure air delivery line, and an air supply control device therebetween including a valve for opening and closing as to said supply line, and a controller for effecting intermittent operation of said valve, said controller embodying a diaphragm having a chamber, said diaphragm in its flexing having transmission for pulsating said valve in effecting intermittent air delivery into the pressure air delivery line, there being an exhaust from said chamber open during closing pulsation of said valve.

4. A tire inflation apparatus embodying a pressure air supply line, a pressure air delivery line, and an air supply controlling device therebetween including a first valve for opening and closing as to said supply line, a controller for effecting intermittent operation of said valve, said controller embodying a diaphragm having a chamber, a second valve, and communicating duct means between said delivery line and extending past the second valve provided with port means affording exhaust from said chamber and for admitting air to said chamber, said duct means past said second valve being at all times above atmospheric pressure, said diaphragm in its flexing having transmission for pulsating said first valve in effecting intermittent air supply into the pressure air delivery line during a delivery of air up to a maximum pressure.

5. In an air pressure regulator, a source of supply of air under pressure, valve mechanism connected to said source, a pipe connected to said mechanism for conducting air from the mechanism, said mechanism including a pressure controlled valve, and a pulsation actuator therefor embodying a pressure chamber having an outlet open during valve closing operation, whereby said valve opens and closes as controlled by said actuator in building up pressure to a predetermined maximum in said pipe.

6. In an air pressure regulator, a source of supply of air under pressure, valve mechanism connected to the said source, a pipe connected to said mechanism for conducting air from the mechanism, said mechanism including a pressure controlled valve, and a pulsatory control for the valve through said mechanism including pressure building step up means embodying a diaphragm, a second valve shiftable by said diaphragm, a duct from said second valve, having pressure therein above atmospheric pressure, and a vent for lowering the pressure in said duct, said vent being open when said second valve is open.

7. A pressure air supply line, a pressure air delivery line, a first valve therebetween, a controller for said valve including a diaphragm exposed to delivery line pressure, pressure stepping up connections influenced by said diaphragm for controlling said valve in effecting pulsatory delivery of air from the pressure air supply line to the pressure air delivery line, a second valve directly shiftable by said diaphragm, a duct from said second valve having a vent open when said second valve is open, and manually operable adjusting means for said connections for varying the control operation of the diaphragm for said first valve.

8. In a device of the class described, a source of air under pressure, piping connected therewith, a service hose communicating with the piping, a valve interposed in said piping, mechanism in controlling relation to said valve having connection with the piping to be affected by the pressure in said hose, said mechanism including a diaphragm, said diaphragm being operable in one direction by air admitted thereto from the piping, and means for imposing predetermined variable pressure on the diaphragm for causing it to operate reversely upon sufficient reduction of the pressure of the air admitted thereto, said valve being operable to closing position when the diaphragm is air operated and operable to open position when the diaphragm is reversely operated, said controlling mechanism having means for retarding the valve closing effect thereof to afford an interval in which air may flow through the piping at the pressure of the source, intermittent operation of the valve obtaining during the flow of air through the hose to a receiver.

9. The combination with a source of air under pressure; of piping through which air is conveyed from said source to a receiver; a primary valve between said source and piping operable to move in a closing direction; mechanism in controlling relation to said primary valve and including a secondary valve connected with the piping and operable by air admitted thereto from said piping, said mechanism being constrained to operate reversely upon sufficient reduction of the pressure air admitted thereto, said mechanism in being air operated enabling the operation of the primary valve in a closing direction and in being reversely operated coacting for an opening adjustment of the primary valve; and means supplied to the valve controlling mechanism for retarding the valve closing effect thereof to afford an interval in which air may flow into the piping at the pressure of the source, intermittent operation of the primary valve obtaining while air is accumulated in the receiver of sufficient pressure to operate upon said valve controlling mechanism to maintain the primary valve out of air delivery position.

10. In an air pressure regulator, a supply line for air under pressure, a housing connected to said line, a pipe connected to said housing for conducting the air from the housing, the housing having an outlet, a pressure controlled valve for opening said outlet to permit the air to escape to the atmosphere from the housing, and adjustable means for causing the valve to open the outlet at various pressures until the predetermined pressure is obtained within the housing, and a second valve for closing the inlet from the supply line into the housing and controlled by the first named valve, said second valve as closed isolating said supply line from said first named valve.

11. In an air pressure regulator, a supply line for air under pressure, a housing connected to said line, a pipe connected to said housing for conducting the air from the housing, the housing providing a chamber having an outlet, a pressure controlled valve pulsating in replenishing said chamber while said outlet permits the air to escape continuously to the atmosphere from said housing, a scale beam, a fulcrum therefor, a weight adjustably located on the beam, and a plunger engaged by the beam between the fulcrum and weight and coacting for modifying the action of the pressure controlled valve.

12. In an air pressure regulator, a supply line for air under pressure, a housing connected to said line, a pipe connected to said housing for conducting air from the housing, the housing providing a chamber having an outlet, a pressure controlled secondary valve pulsating in replenishing said chamber during the time said outlet permits the air to escape from said housing, a scale beam connected to control the valve, a weight adjustably located on the beam, and a primary valve for closing the inlet from the supply line into the housing and controlled by the secondary valve, said primary valve as closed isolating said supply line from the secondary valve.

13. In an air pressure regulator, a supply line for air under pressure, a housing connected to said line, a pipe connected to said housing for conducting the air from the housing, the housing providing a chamber having an outlet, a pressure controlled secondary valve pulsating in replenishing said chamber during the time said outlet permits the air to escape from said housing, a scale beam connected to control the valve, a weight adjustably located on the beam, means for adjustably locating the weight on the beam, and a primary valve for closing the inlet from the supply line into the housing and controlled by the secondary valve, said primary valve as closed isolating said supply line from the secondary valve.

14. In an air pressure regulator, a supply line for air under pressure, a housing connected to said line, a pipe connected to the housing for conducting the air from the housing, a secondary valve, a diaphragm connected to said valve for operating the valve according to the pressure in the housing, a scale beam, a pin supported by the diaphragm for engaging the scale beam, a weight adjustably located on the scale beam, and a primary valve for closing the inlet from the supply line into the housing, a pair of diaphragms connected to the primary valve, one of the diaphragms having an opening and the housing having an opening communicating the space between the two diaphragms and the atmosphere, the housing having a passageway closed and opened by the secondary valve and communicating with the opening in the diaphragm.

15. A tire inflation apparatus including a regulator valve, a pressure air supply line thereto, means for adjusting the setting of said valve, said valve including an inlet port toward said line, closure means for said port for cutting off all communication of the valve with said line, and a delivery pressure air flow oscillation device coacting with said closure means and isolated by said closed inlet port from said supply line, said device coacting for effecting pulsation in air delivery from said valve, said device including a chamber normally above atmospheric pressure with the valve closed or opened.

16. A delivery pressure control mechanism comprising a primary chamber, a secondary chamber, a primary valve in the primary chamber, adjustable controlling means including a secondary valve in the secondary chamber and coacting between said primary chamber outlet side of the primary valve and said secondary chamber, said controlling means determining seating of said secondary valve, and controllable leakage means for the secondary chamber on the side of the secondary valve remote from the primary valve for affecting seating of said secondary valve, said leakage means being open during closing operation of the primary valve.

17. An adjustable controller, a plunger directly acted upon by said controller, a valve body providing a port to be controlled by said plunger, a diaphragm rigidly connected to the plunger as a packless valve member in said body shiftable at all times with the controller and diaphragm as to said port, a pressure supply line providing a port, a primary valve comprising an additional plunger movable relatively to the controller plunger for closing the supply line port, and a diaphragm actuator for the primary valve plunger, said valve body providing a chamber for said primary valve plunger, there being a passage from said primary valve plunger chamber to said controlled port for affecting control of said primary valve by shifting said primary valve diaphragm to cause said primary valve plunger to close its port and thereby isolate both diaphragms from supply line pressure.

18. A valve, a housing for the valve, a rockable arm in said housing having a free end providing a way toward said end, a fixed fulcrum for the arm, a weight movable along said way, a valve controlling plunger engaging the arm between the fulcrum and weight, a control for the valve including a pressure chamber having a vent open during valve closing movement and coacting to effect pulsating valve delivery operation and rock said arm, engaging means clear of disturbing the counter-poise action of said weight during rocking of the arm, said means being effective for positioning said weight independently of movement by rocking of said arm, and means exterior of the housing for controlling said engaging means.

19. A valve, a housing for the valve, said housing having a window, a rockable arm in said housing having a free end providing a way toward said end, a fixed fulcrum for the arm, a weight shiftable along said way adjacent said window, a valve plunger engaging the arm between the fulcrum and weight, said valve having flow control connection affecting valve opening and closing for reciprocating the plunger to cause rocking of said arm at the window to show delivery operation of the valve, and means for moving said weight along said way, said means being operable from exterior of the housing for positioning said weight along said way without interfering with the rocking movement of said arm, whereby through the window there may be observed the weight location and arm movement for thereby checking valve delivery operation.

20. A valve, a housing for the valve, said housing having a window, a notation carrying rockable arm in said housing having a free end providing a way toward said end, a fixed fulcrum for the arm, an indicating weight movable along said way past said window, a valve delivery pressure controlling plunger engaging the arm between the fulcrum and weight for rocking said arm to show delivery operation of said valve, and means for moving said weight along said way for notation location on said arm to predetermine the pressure for discontinuance of valve delivery, said means being operable from exterior of the housing for positioning said weight along said way without interfering with the rocking movement of said arm, whereby through the window there may be observed the weight indication for predetermined pressure and also for arm movement for thereby checking valve delivery operation.

21. A valve housing having a port, a pressure supply line thereto, a member for controlling said port, a pair of spaced different effective area directly connected diaphragms coacting with the member for actuating the member to port closing position and isolating both diaphragms from supply line pressure, said diaphragms being mounted in the housing and each having clearance between the housing and member for flexing both ways as to each thereof, and means providing above atmospheric controllable pressure pulsation communication between one side of one diaphragm and the opposite side of the other diaphragm including a restricted leakage port.

22. A valve housing having supply and discharge ducts and a port therebetween, a plunger for controlling said port, a pair of spaced different effective area directly connected diaphragms coacting with the plunger for effecting reciprocations of the plunger during air delivery up to a predetermined pressure, said diaphragms defining a chamber for said port and discharge duct on one side thereof and a second chamber on the other side thereof away from said plunger, there being a passage between said chambers as the sole communication to the second chamber from said ducts and isolated from said supply duct by said plunger closed port, and a control for maintaining above atmospheric pressure in said passage.

23. A valve housing having supply and discharge ducts and a port therebetween, a plunger for controlling said port, directly connected diaphragms coacting with the plunger for effecting pulsating operation of the plunger during air delivery up to a predetermined pressure, said diaphragms defining a port chamber on one side thereof and a second chamber on the other side thereof, there being a passage from said port chamber to said second chamber as the sole communication to the second chamber for said ducts, said port as closed by the plunger isolating both diaphragms from said supply duct, an automatic control for maintaining above atmospheric pressure in said passage, and an additional manual control for said passage.

24. A tire inflation apparatus including a supply line, a delivery line provided with a check valve to be unseated by a tire valve stem, a valve between said lines and remote from said check valve, a housing for said valve, a rockable arm having a free end, a fulcrum for the arm, an indicator adjustable longitudinally along said arm, a valve controlling plunger engaged by the arm between said fulcrum and indicator, and means operable from exterior of the housing independently of movement by rocking of said arm and mounted independently of participating in arm oscillation for positioning said indicator along said arm for determining the maximum tire pressure by shutting off said valve.

In testimony whereof, I have hereunto signed my name to this specification.

EARL M. MORLEY.